(12) United States Patent
Bazzana

(10) Patent No.: US 11,685,831 B2
(45) Date of Patent: Jun. 27, 2023

(54) FILLED POLYMERIC RESIN MATERIALS AND METHODS OF MAKING

(71) Applicant: NIKE, Inc., Beaverton, OR (US)

(72) Inventor: Stephane Bazzana, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 1157 days.

(21) Appl. No.: 16/287,688

(22) Filed: Feb. 27, 2019

(65) Prior Publication Data

US 2019/0264027 A1 Aug. 29, 2019

Related U.S. Application Data

(60) Provisional application No. 62/636,082, filed on Feb. 27, 2018.

(51) Int. Cl.

| | | |
|---|---|---|
| *C08L 75/04* | (2006.01) | |
| *C08J 5/04* | (2006.01) | |
| *C08K 11/00* | (2006.01) | |
| *C08K 13/04* | (2006.01) | |
| *C08K 9/10* | (2006.01) | |
| *C08G 18/32* | (2006.01) | |
| *C08G 18/40* | (2006.01) | |
| *C08G 18/66* | (2006.01) | |
| *C08G 18/76* | (2006.01) | |
| *C08G 18/28* | (2006.01) | |
| *C08G 18/61* | (2006.01) | |
| *C08G 18/48* | (2006.01) | |
| *C08J 11/06* | (2006.01) | |
| *C08J 5/10* | (2006.01) | |
| *C08J 5/18* | (2006.01) | |
| *C08G 101/00* | (2006.01) | |

(52) U.S. Cl.
CPC ............ *C08L 75/04* (2013.01); *C08G 18/288* (2013.01); *C08G 18/3206* (2013.01); *C08G 18/4009* (2013.01); *C08G 18/4833* (2013.01); *C08G 18/61* (2013.01); *C08G 18/6677* (2013.01); *C08G 18/7671* (2013.01); *C08J 5/046* (2013.01); *C08J 5/10* (2013.01); *C08J 5/18* (2013.01); *C08J 11/06* (2013.01); *C08K 9/10* (2013.01); *C08K 11/005* (2013.01); *C08K 13/04* (2013.01); *C08G 2101/00* (2013.01); *C08G 2350/00* (2013.01); *C08J 2300/24* (2013.01); *C08J 2375/04* (2013.01); *C08J 2425/08* (2013.01); *C08J 2431/04* (2013.01); *C08L 2207/04* (2013.01); *C08L 2207/24* (2013.01)

(58) Field of Classification Search
None
See application file for complete search history.

(56) References Cited

U.S. PATENT DOCUMENTS

| | | | | |
|---|---|---|---|---|
| 6,169,128 B1 * | 1/2001 | Vivaudou | ................ | C08J 11/06 524/80 |
| 2013/0237633 A1 * | 9/2013 | Tamir | ....................... | C08J 11/06 524/35 |

FOREIGN PATENT DOCUMENTS

AT 511516 A1 * 12/2012 ................ C08J 7/16

* cited by examiner

*Primary Examiner* — Jeffrey D Washville

(74) *Attorney, Agent, or Firm* — Thomas | Horstemeyer, LLP

(57) ABSTRACT

The present disclosure provides for articles formed of a filled polymeric resin material. More specifically, the present disclosure relates to polymeric resin materials that include a filler that includes of a mixture of cured rubber granules, foam granules, and/or textile fibers. The filler can be suspended in and/or encapsulated by the polymeric resin material. The polymeric resin material, the filler, or both can include waste or scrap material from manufacturing or from ground post-consumer waste.

17 Claims, No Drawings

FILLED POLYMERIC RESIN MATERIALS AND METHODS OF MAKING

CROSS-REFERENCE TO RELATED APPLICATIONS

This application claims the benefit of and priority to U.S. Provisional Application Ser. 62/636,082, having the title "FILLED POLYMERIC RESIN MATERIALS", filed on Feb. 27, 2018, which are incorporated herein by reference in their entirety.

BACKGROUND

Ground tire rubber used as a filler in polymeric resin materials used for purposes ranging from athletic equipment to construction materials, including construction materials used to reduce sound production and transmission.

DETAILED DESCRIPTION

The present disclosure provides for articles formed of a filled polymeric resin material. More specifically, the present disclosure relates to polymeric resin materials that include a filler. The filler can include a mixture of cured rubber granules, foam granules, and/or textile fibers. The filler can be suspended in and/or encapsulated by the polymeric resin material. The polymeric resin material, the filler, or both can include waste or scrap material from manufacturing or from ground post-consumer waste, for example footwear waste or scrap. The polymer resin material can comprise a thermoplastic polymer (e.g., thermoplastic polyurethane (TPU)), a thermoset polymer (e.g., a natural or synthetic cured rubber composition), or a combination thereof.

As described above, the polymeric resin material, the filler, or both can include ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof. The article can include at least 10, 30, or 50 percent by weight of the filler based on a total weight of the article.

Additionally, in some examples, the inclusion of the filler (e.g., foam and rubber granules) in the article increases the acoustical properties of the article by increasing the noise reduction coefficient (e.g., decreases the level of sound transmission of the article) as compared to a similar article that uses only cured rubber granules as filler. Similarly, the article can be an insulating panel or underlayment, in that the article has a thermal resistance greater than a thermal resistance of a second article including only rubber granules as filler. Also, inclusion of fillers (e.g., textile fibers) from waste or scrap or post-consumer ground material can improve the tensile strength and abrasion resistance of the articles.

The disclosure also describes methods of manufacturing these articles by suspending the filler in a polymeric resin material, and solidifying the polymeric resin material, thereby encapsulating the suspended filler in solidified polymeric resin material. Including foam granules in the filler mixture reduces the density of the article as compared to using only cured rubber granules as filler.

The present disclosure provides for an article comprising: a polymeric resin material comprising a filler, wherein the filler includes a plurality of cured rubber granules, foam granules, textile fibers, or a combination thereof, wherein the filler is suspended in and encapsulated by the polymeric resin material. The polymeric resin material, the filler, or both can include waste or scrap material from footwear manufacturing or from ground post-consumer waste footwear. The polymer resin material can be a thermoplastic polymer (e.g., thermoplastic polyurethane (TPU)) or a thermoset polymer (e.g., a natural or synthetic cured rubber composition).

The filler can include ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof. The article can include at least 50 percent by weight of the filler based on a total weight of the article.

The article can be an acoustical panel or underlayment, where the acoustical panel or underlayment has a Delta IIC rating of at least 20. The article can have a sound transmission loss that is at least 10 percent greater than a sound transmission loss of a second article. The second article comprises a second polymeric resin material comprising a second filler, where the second polymeric resin material is the same as the polymeric resin material of the article, but the second filler consists essentially of tire rubber granules. The concentration of the tire rubber granules in the second polymeric resin material can be within 2 weight percent of a concentration of the filler in the polymeric resin material of the article.

The article can be an insulating panel or underlayment, where the insulating panel or underlayment has an R rating of at least 5. The article has a thermal resistance at least 10 percent greater than a thermal resistance of a second article. The second article comprises a second polymeric resin material comprising a second filler, where the second polymeric resin material is the same as the polymeric resin material of the article, but the second filler consists essentially of tire rubber granules. The concentration of the tire rubber granules in the second polymeric resin material is within 2 weight percent of a concentration of the filler in the polymeric resin material of the article.

The present disclosure provides for a method of manufacturing an article, the method comprising: suspending a filler in a polymeric resin material, wherein the filler comprises a plurality of cured rubber granules, foam granules, textiles fibers, or a combination thereof, and solidifying the polymeric resin material, thereby encapsulating the suspended filler in solidified polymeric resin material. The method can further comprise milling cured rubber to form the cured rubber granules, or milling foam to form the foam granules, or milling or shredding textiles to form the textile fibers, or a combination thereof.

This disclosure is not limited to particular aspects, embodiment or examples described, and as such may, of course, vary. The terminology used herein serves the purpose of describing particular aspects, embodiments and examples only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects, embodiments and examples described and illustrated herein has discrete components and features which may be readily separated from or combined with the features of any of the other several aspects, embodiments and examples without departing from the scope or spirit of the present disclosure. Any recited method may be carried out in the order of events recited or in any other order that is logically possible.

Aspects, embodiments and examples of the present disclosure will employ, unless otherwise indicated, techniques of material science, chemistry, textiles, polymer chemistry, textile chemistry, and the like, which are within the skill of the art. Such techniques are explained fully in the literature.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "weight" refers to a mass value, such as having the units of grams, kilograms, and the like. Further, the recitations of numerical ranges by endpoints include the endpoints and all numbers within that numerical range. For example, a concentration ranging from 40 percent by weight to 60 percent by weight includes concentrations of 40 percent by weight, 60 percent by weight, and all water uptake capacities between 40 percent by weight and 60 percent by weight (e.g., 40.1 percent, 41 percent, 45 percent, 50 percent, 52.5 percent, 55 percent, 59 percent, etc.). This will also apply to parts per hundred resin (phr).

As used herein, the term "providing", such as for "providing a structure", when recited in the claims, is not intended to require any particular delivery or receipt of the provided item. Rather, the term "providing" is merely used to recite items that will be referred to in subsequent elements of the claim(s), for purposes of clarity and ease of readability.

In regard to "consists essentially of", the material referred to (e.g., second filler) does not include substantial amounts (e.g., less than about 1 weight percent) of types of materials besides those listed, but the material may include non-polymeric ingredients that may be found in the waste, scrape, and/or post-consumer waste materials, and the like.

As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

This disclosure describes articles formed of a polymeric resin material that includes a filler. The filler can be formed of a mixture of a plurality of cured rubber granules, foam granules, textile fibers, or any combination thereof. The filler can be suspended in and encapsulated by the polymeric resin material.

The polymeric resin material, the filler, or both can include ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof. In an example where ground footwear material is used to form the filler, the inclusion of cured rubber granules from footwear rubber improve properties of the article. For example, the acoustical and/or thermal properties of the articles of the present disclosure as compared to similar articles that use ground tire rubber in the filler can be improved. The inclusion of textile fibers from textile waste or scrap or from ground footwear uppers improves the tensile strength and abrasion resistance of the articles.

The disclosure also describes methods of manufacturing these articles by suspending the filler in a polymeric resin material, and solidifying the polymeric resin material, thereby encapsulating the suspended filler in solidified polymeric resin material. Including foam granules in the filler mixture reduces the density of the article as compared to using only cured rubber granules as filler.

When the one or more polymers includes one or more thermoset polymers, in the manufacturing method, the step of solidifying the polymeric resin material can comprise curing the polymeric resin material. Curing the polymeric resin material can comprise forming physical or chemical crosslinks between a plurality of polymers of the polymeric resin material.

When the one or more polymers includes one or more thermoplastic polymers, in the method, solidifying the polymeric resin material can comprise reducing a temperature of the polymeric resin material to a temperature at least 20 degrees C. below a melting point of the one or more thermoplastic polymers.

In the method of manufacturing the article, the method can further comprise milling cured rubber to form the cured rubber granules, or milling foam to form the foam granules, or both. The milling process can be a mechanical process, a cryogenic process, or can include both mechanical and cryogenic milling. The milling process can comprise milling manufacturing waste and scrap materials, or milling post-consumer waste materials, or milling both.

Having described aspects of the present disclosure generally, additional details are provided. The polymeric resin material, the filler, or both can include one or more polymers (e.g., thermoset polymers or thermoplastic polymers) and/or one or more rubbers (e.g., natural rubbers, synthetic rubbers). While the polymers and rubbers are described in some detail here, additional details regarding polymer and rubbers are provided below. In particular examples, the polymeric resin material includes a thermoplastic polyurethane (TPU). In other examples, the polymeric resin material includes polyurethane (PU) foam. In further examples, the resin can comprise cured natural rubbers, cured synthetic rubbers, and combinations thereof. The one or more polymers of the polymeric resin material can be selected from cured natural rubbers, cured synthetic rubbers, and combinations thereof. The one or more polymers can be selected from polyurethanes, polyamides, polyesters, polyethers, any co-polymers thereof, and any combinations thereof. The one or more polymers can comprise or consist essentially of at least one TPU. The at least one TPU can include waste or scrap TPU from footwear manufacturing. The at least one TPU can be a TPU derived from an aromatic isocyanate, such as, for example methylene diphenyl diisocyanate (MDI). Alternatively or additionally, the at least one TPU can include a TPU derived from an alkyl isocyanate.

As described above, the filler can include ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof. The filler can comprise at least 5 weight percent of the article. For example, the filler can comprise at least 10 weight percent, or at least 20 weight percent, or at least 40 weight percent of the article, or at least 50 weight percent of the article. The polymeric resin material can comprise about 60 weight percent or more, or about 80 weight percent or more, or about 95 weight percent or more of the article. The article can be about 10 to 50 weight percent filler and about 50 to 90 weight percent of the polymeric resin material or about 30 to 50 weight percent filler and about 50 to 70 weight percent of the polymeric resin material or about 50 weight percent filler and about 50 weight percent of the polymeric resin material.

The cured rubber granules of the filler can include ground waste or scrap cured rubber from footwear manufacturing. Similarly, the foam granules of the filler can include ground waste or scrap foam from footwear manufacturing. The textile fibers can include ground or shredded waste or scrap textiles from footwear manufacturing. The cured rubber granules can include post-consumer waste ground cured rubber from footwear. The foam granules can include post-consumer waste ground foam from footwear. The textile fibers can include ground or shredded waste or scrap textiles from footwear manufacturing. The filler can include post-consumer waste ground cured rubber, foam and textiles from footwear. The filler can include both post-consumer waste ground cured rubber from footwear, post-consumer waste ground foam from footwear, and post-consumer waste ground textile fibers from footwear. For example, the filler includes at least 50 percent by weight, or at least 70 percent by weight, or at least 80 percent by weight, or at least 90 percent of post-consumer waste ground materials. For example, the filler includes about 50 to 100 percent by weight, or about 70 to 100 percent by weight, or about 80 to 100 percent by weight, or about 90 to 100 percent of post-consumer waste ground materials.

When the granules and textile fibers of the filler are obtained from ground footwear (i.e., including manufacturing waste or scrap, and post-consumer waste), the footwear or components of footwear that are ground to form the filler may include portions in which a cured rubber material is affixed (e.g., chemically) to a foam, either using an adhesive or by direct bonding. Grinding these items will result in a plurality of granules that include a portion of cured rubber affixed to a portion of foam. Similarly, the granules and fibers will result in a plurality of granules that include a portion in which cured rubber is affixed to fibers, and/or a portion in which foam is affixed to fibers.

The foam granules can be obtained from foams comprising a variety of polymers. For example, the foam can include an ethylene-vinyl acetate (EVA) copolymer. The foam can include a styrene-ethylene-butadiene-styrene (SEBS) copolymer. The foam can include a urethane polymer or copolymer such as a polyurethane (PU). Additional details regarding polymer that can form foam is provided below. The foam granules can have a specific gravity ranging from about 0.1 to 0.5, or from about 0.1 to about 0.4.

A variety of types of textiles can be shredded or ground to obtain the textile fibers of the filler. For example, the textile can be a woven textile. The textile can be a knit textile. The textile can be a braided textile. The textile can be a non-woven textile such as a synthetic leather. The textile can be a leather. The textile fibers can be obtained from staple fibers, filaments, roving, sliver, monofilament yarn, multifilament yarn, cabling, etc. The textile fibers can include natural fibers including cellulose-based fibers, protein-based fibers, and mineral-based fibers. The textile fibers can include man-made fibers including natural polymer and synthetic polymer fibers. The synthetic polymer fibers can be polyester fibers, polyether fibers, polyurethane fibers, or polyamide fibers. Additional details regarding textiles is provided below.

A dimension of each of the plurality of cured rubber granules in the filler can be about 5 mm or less, or about 2.5 mm or less, or about 1 mm or less, or about 0.5 mm or less. A dimension of each of the plurality of foam granules in the filler can be about 5 mm or less, or about 2.5 mm or less, or about 1 mm or less, or about 0.5 mm or less. A dimension of each of the plurality of textile fibers in the filler can be about 5 mm or less, or about 2.5 mm or less, or about 1 mm or less, or about 0.5 mm or less. Alternatively or in addition, the filler can pass through a mesh size of 10 or less, of 20 or less, of 30 or less, or of 40 or less.

The article can have an elongation of at least 50 percent, or at least 100 percent, or at least 200 percent, or at least 300 percent, or at least 500 percent. The article can have a Shore A hardness of less than 40, or less than 35, or less than 30.

The article can be in the form of a sheet. The method can include the step of forming the filled polymeric resin material into a sheet. The sheet can have a thickness of at least 2 mm. For example, the thickness of the sheet can be at least 5 mm, or at least 10 mm, or at least 12 mm. The sheet can be provided in the form of a roll.

In a particular example, the article is a construction material such as, for example, an underlayment. Including a filler including a plurality of cured rubber granules, or foam granules, or textile fibers or any combination thereof, where the filler is suspended in and encapsulated by the polymeric resin material, increases the noise reduction factor of the article, increases the thermal resistance of the article and increases the tensile strength of the article.

The construction material can be an acoustical panel or underlayment, such as for reducing the generation of or transmission of sound. The acoustical panel or underlayment can have a Delta IIC rating of at least 20, or at least 22, or at least 24. In some examples, including the foam granules in the filler reduces the density of the article while increasing the effectiveness of the article in reducing the production or transmission of sound. The article can have a sound transmission loss that is at least 10 percent greater than a sound transmission loss of a second article. The second article comprises a second polymeric resin material comprising a second filler, where the second polymeric resin material is the same as the polymeric resin material of the article, but the second filler consists essentially of tire rubber granules. The concentration of the tire rubber granules in the second polymeric resin material is within 2 weight percent of a concentration of the filler mixture in the polymeric resin material of the article.

In another example, the construction material is a thermal insulating panel or underlayment, such as for increasing thermal resistance for insulating purposes. The thermal panel or underlayment can have an R rating of at least 5, or at least 14, or at least 32. In some examples, including the foam granules in the filler increases the effectiveness of the article in increasing the thermal resistance of the article. The article can have a thermal resistance is at least 10 percent greater than a thermal resistance of a second article. The second article comprises a second polymeric resin material comprising a second filler, where the second polymeric resin material is the same as the polymeric resin material of the article, but the second filler consists essentially of tire rubber granules. The concentration of the tire rubber granules in the second polymeric resin material is within 2 weight percent of a concentration of the filler mixture in the polymeric resin material of the article.

Having described the present disclosure in general, additional details are provided. The polymeric resin material, the filler, or both can comprise rubber. In regard to rubber, the rubber (e.g., uncured rubber, partially cured rubber, or cured rubber) can include one or more natural and/or synthetic rubbers. The natural or synthetic rubbers can include: butadiene rubber, styrene-butadiene (SBR) rubber, butyl rubber, isoprene rubber, urethane rubber (e.g., millable), nitrile rubber, neoprene rubber, ethylene propylene diene monomer (EPDM) rubber, ethylene-propylene rubber, urethane rubber or any combination thereof. Other examples of rubber compounds include, but are not limited to polynorbornene rubber, methyl methacrylate butadiene styrene rubber (MBS), styrene ethylene butylene (SEBS) rubber, silicone rubber, urethane rubber, and mixtures thereof. The natural or synthetic rubbers may be individually selected as virgin materials, regrind materials, or a mixture thereof.

The polymeric resin material, the filler, or both can comprise a polymer as described herein and below. As used herein, the term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units that include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

The polymer resin material and/or filler of the present disclosure can be or can comprise a elastomeric material. The article comprising the elastomeric material of the present disclosure can further comprise a thermoplastic material. In general, a thermoplastic material softens or melts when heated and returns to a solid state when cooled. The thermoplastic material transitions from a solid state to a softened state when its temperature is increased to a temperature at or above its softening temperature, and a liquid state when its temperature is increased to a temperature at or above its melting temperature. When sufficiently cooled, the thermoplastic material transitions from the softened or liquid state to the solid state. As such, the thermoplastic material may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic material can have a melting temperature from about 90 degrees C. to about 190 degrees C. when determined in accordance with ASTM D3418-97 as described herein below, and includes all subranges therein in increments of 1 degree. The thermoplastic material can have a melting temperature from about 93 degrees C. to about 99 degrees C. when determined in accordance with ASTM D3418-97 as described herein below. The thermoplastic material can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic material can have a glass transition temperature from about −20 degrees C. to about 30 degrees C. when determined in accordance with ASTM D3418-97 as described herein below. The thermoplastic material can have a glass transition temperature (from about −13 degree C. to about −7 degrees C. when determined in accordance with ASTM D3418-97 as described herein below. The thermoplastic material can have a glass transition temperature from about 17 degrees C. to about 23 degrees C. when determined in accordance with ASTM D3418-97 as described herein below.

The thermoplastic material can have a melt flow index from about 10 to about 30 cubic centimeters per 10 minutes ($cm^3/10$ min) when tested in accordance with ASTM D1238-13 as described herein below at 160 degrees C. using a weight of 2.16 kilograms (kg). The thermoplastic material can have a melt flow index from about 22 $cm^3/10$ min to about 28 $cm^3/10$ min when tested in accordance with ASTM D1238-13 as described herein below at 160 degrees C. using a weight of 2.16 kg.

The thermoplastic material can have a cold Ross flex test result of about 120,000 to about 180,000 cycles without cracking or whitening when tested on a plaque of the elastomeric material in accordance with the cold Ross flex test as described herein below. The thermoplastic material can have a cold Ross flex test result of about 140,000 to about 160,000 cycles without cracking or whitening when tested on a plaque of the elastomeric material in accordance with the cold Ross flex test as described herein below.

The thermoplastic material can have a modulus from about 5 megaPascals (MPa) to about 100 MPa when determined on a plaque in accordance with ASTM D412-98 Standard Test Methods for Vulcanized Rubber and Thermoplastic Rubbers and Thermoplastic Elastomers-Tension with modifications described herein below. The thermoplastic material can have a modulus from about 20 MPa to about 80 MPa when determined on a plaque in accordance with ASTM D412-98 Standard Test Methods for Vulcanized Rubber and Thermoplastic Rubbers and Thermoplastic Elastomers-Tension with modifications described herein below.

The polymer resin material and/or filler can be a thermoset material. A "thermoset material" is understood to refer to a material that cannot be heated and melted, as its melting temperature is at or above its decomposition temperature. A "thermoset material" refers to a composition that comprises at least one thermoset polymer. The thermoset polymer and/or thermoset material can be prepared from a precursor (e.g., an uncured or partially cured polymer or material) using actinic radiation (e.g., thermal energy, ultraviolet radiation, visible radiation, high energy radiation, infrared radiation) to form a partially cured or fully cured polymer or material which no longer remains fully thermoplastic. In some cases, the cured or partially cured elastomeric material may retain some thermoplastic properties, in that it is possible to partially soften and mold the elastomeric material at elevated temperatures and/or pressures, but it is not possible to melt the elastomeric material. The curing can be promoted, for example, with the use of high pressure and/or a catalyst. The curing process is irreversible since it results in crosslinking and/or polymerization reactions of the precursors. The uncured compositions or partially cured elastomeric materials can be malleable or liquid prior to curing. In some cases, the uncured composition or partially cured elastomeric materials can be molded into their final shape, or used as adhesives. Once hardened, a thermoset material cannot be re-melted in order to be reshaped, but it may be possible to soften it. The textured surface can be formed by partially or fully curing the composition to lock in the textured surface into the elastomeric material.

The polymer resin material and/or filler can comprise a polyurethane. The article comprising the elastomeric material can further include one or more components comprising a polyurethane. The polyurethane can be a thermoplastic polyurethane (also referred to as "TPU"). Alternatively, the polyurethane can be a thermoset polyurethane. Additionally, the polyurethane can be an elastomeric polyurethane, including an elastomeric TPU or an elastomeric thermoset polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

(Formula 1)

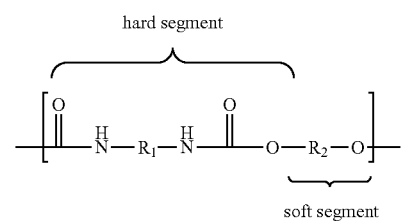

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_2$, each $R_3$ independently is an aliphatic or aromatic functional group.

(Formula 2)

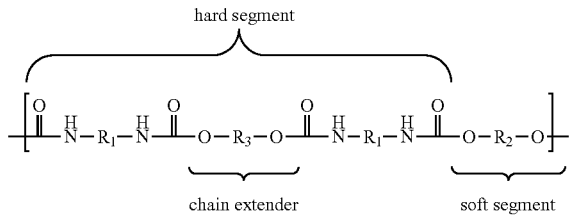

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers that form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term $C_n$, it means the alkene or alkylene group has "n" carbon atoms. For example, $C_{1-6}$ alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90 percent of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80 percent of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol, 1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol, 1,5, diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkenylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkenylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ group can include charged groups that are capable of binding to a counterion to ionically crosslink the polymer and form ionomers. For example, $R_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

(Formula 3)

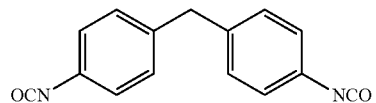

The pendant hydrophilic group can be a polyethylene oxide group and the linking group can be MDI, as shown below.

(Formula 4)

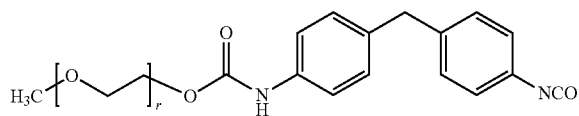

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

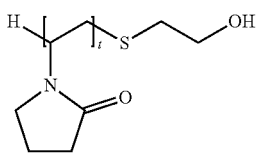

(Formula 5)

At least one $R_2$ group in the polyurethane can include a polytetramethylene oxide group. At least one $R_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference. For example, the $R_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

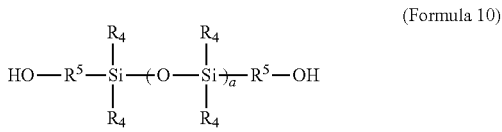

(Formula 10)

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, isopropyl, n-butyl, isobutyl, s-butyl, t-butyl, ethenyl, propenyl, phenyl, and polyethylene groups.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

Optionally, the polyurethane can include an at least partially crosslinked polymeric network that includes polymer chains that are derivatives of polyurethane. The level of

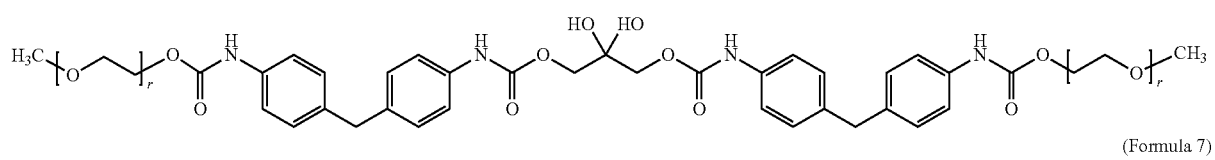

(Formula 6)

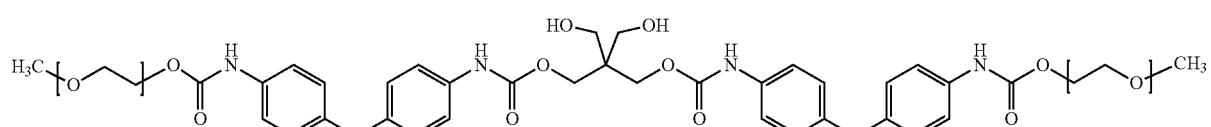

(Formula 7)

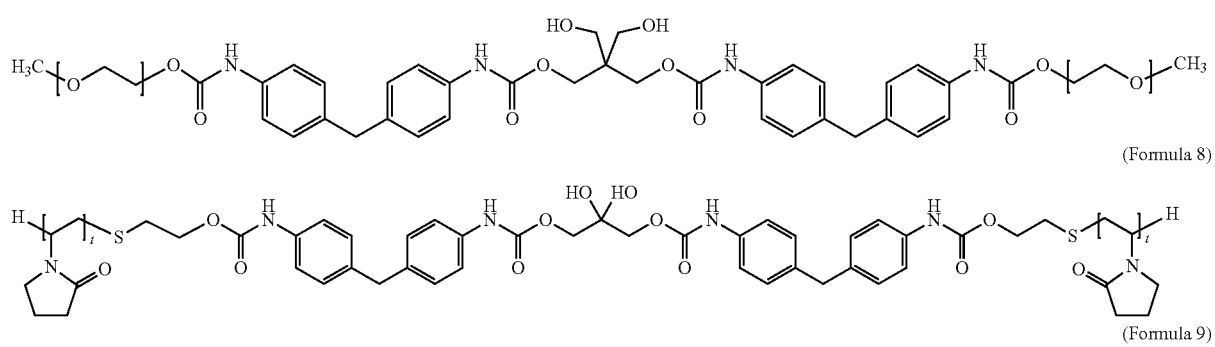

(Formula 8)

(Formula 9)

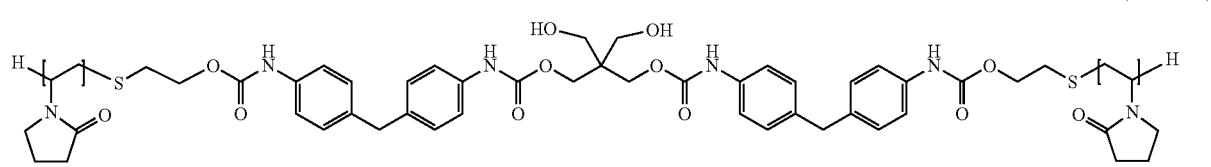

At least one $R_2$ of the polyurethane can be a polysiloxane. In these cases, the $R_2$ group can be derived from a silicone monomer of Formula 10, such as a silicone monomer disclosed in U.S. Pat. No. 5,969,076, which is hereby incorporated by reference:

crosslinking can be such that the polyurethane retains thermoplastic properties (i.e., the crosslinked thermoplastic polyurethane can be melted and re-solidified under the processing conditions described herein). The crosslinked polyurethane can be a thermoset polymer. This crosslinked polymeric network can be produced by polymerizing one or more isocyanates with one or more polyamino compounds, polysulfhydryl compounds, or combinations thereof, as shown in Formulas 11 and 12, below:

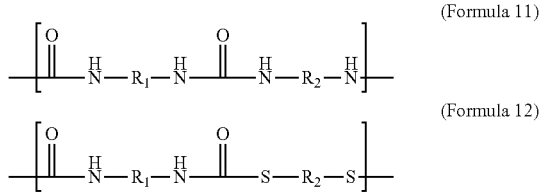

(Formula 11)

(Formula 12)

where the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

One or more of the polyurethanes can be produced by polymerizing one or more isocyanates with one or more polyols to produce copolymer chains having carbamate linkages (—N(C═O)O—) and one or more water-uptake enhancing moieties, where the polymer chain includes one or more water-uptake enhancing moieties (e.g., a monomer in polymer chain). The water-uptake enhancing moiety can be added to the chain of Formula 1 or 2 (e.g., within the chain and/or onto the chain as a side chain). Inclusion of the water-uptake enhancing moiety can enable the formation of a polyurethane hydrogel.

The polyurethane can include one or more water-uptake enhancing moieties. The water-uptake enhancing moiety can have at least one hydrophilic (e.g., poly(ethylene oxide)), ionic or potentially ionic group. A polyurethane can be formed by incorporating a moiety bearing at least one hydrophilic group or a group that can be made hydrophilic (e.g., by chemical modifications such as neutralization) into the polymer chain. For example, these compounds can be nonionic, anionic, cationic or zwitterionic or the combination thereof. In one example, anionic groups such as carboxylic acid groups can be incorporated into the chain in an inactive form and subsequently activated by a salt-forming compound, such as a tertiary amine. Other water-uptake enhancing moieties can also be reacted into the backbone through urethane linkages or urea linkages, including lateral or terminal hydrophilic ethylene oxide or ureido units.

The water-uptake enhancing moiety can be a one that includes carboxyl groups. Water-uptake enhancing moiety that include a carboxyl group can be formed from hydroxycarboxylic acids having the general formula $(HO)_xQ(COOH)_y$, where Q can be a straight or branched bivalent hydrocarbon radical containing 1 to 12 carbon atoms, and x and y can each independently be 1 to 3. Illustrative examples include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof.

The water-uptake enhancing moiety can include reactive polymeric polyol components that contain pendant anionic groups that can be polymerized into the backbone to impart water dispersible characteristics to the polyurethane. Anionic functional polymeric polyols can include anionic polyester polyols, anionic polyether polyols, and anionic polycarbonate polyols, where additional detail is provided in U.S. Pat. No. 5,334,690.

The water-uptake enhancing moiety can include a side chain hydrophilic monomer. For example, the water-uptake enhancing moiety including the side chain hydrophilic monomer can include alkylene oxide polymers and copolymers in which the alkylene oxide groups have from 2-10 carbon atoms as shown in U.S. Pat. No. 6,897,281. Additional types of water-uptake enhancing moieties can include thioglycolic acid, 2,6-dihydroxybenzoic acid, sulfoisophthalic acid, polyethylene glycol, and the like, and mixtures thereof. Additional details regarding water-dispersible enhancing moieties can be found in U.S. Pat. No. 7,476,705.

Polyamides

The polymeric resin material and/or the filler can comprise a polyamide. The article comprising the elastomeric material can further one or more components comprising a polyamide. The polyamide can be a thermoplastic polyamide, or a thermoset polyamide. The polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein $R_6$ group represents the portion of the polyamide derived from the lactam or amino acid.

(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or laurolactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

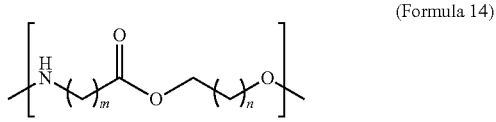

(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

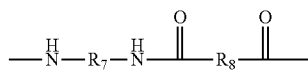

(Formula 15)

The $R_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the $R_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The $R_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

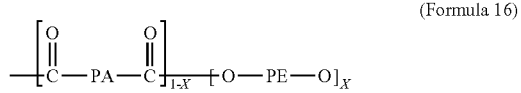

(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, ω-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine that can be used can include an aliphatic diamine containing from 6 to 12 atoms and can be acyclic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide)s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV 1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly (ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies. In other cases, the crosslinked polyamide is a thermoset polymer.

Polyesters

The polymeric resin material and/or the filler can comprise a polyester. The article comprising the elastomeric material can further one or more components comprising a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or aralphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly (3-hydroxbutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/ tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly(α-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The polymeric resin material and/or the filler can comprise a polyolefin. The article comprising the elastomeric material can further one or more components comprising a polyolefin.

The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary polyolefins can include polyethylene, polypropylene, and olefin elastomers (e.g., metallocene-catalyzed block copolymers of ethylene and α-olefins having 4 to about 8 carbon atoms). The polyolefin can be a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The polymeric resin material and/or the filler can further comprise one or more processing aids. The article comprising the elastomeric material can further one or more components comprising one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers As described above, the polymeric resin material and/or the filler can be a thermoplastic composition. For example, the thermoplastic composition can comprise one or more of thermoplastic polyurethanes, thermoplastic polyesters, thermoplastic polyamides, thermoplastic polyolefins, or a copolymer or combination including of any of the foregoing.

The thermoplastic composition can have a softening or melting point of about 80° C. to about 140° C. A temperature of the thermoplastic composition can be increased to a temperature at or above creep relaxation temperature ($T_{cr}$), Vicat softening temperature ($T_{vs}$), heat deflection temperature ($T_{hd}$), and/or melting temperature ($T_m$). In an aspect, the layers or structure can be attached using the thermoplastic composition while the temperature is maintained at or above the creep relaxation temperature, the heat deflection temperature, the Vicat softening temperature, or the melting temperature, of the thermoplastic composition. The layers or structure can be attached using the thermoplastic composition after the temperature of the thermoplastic composition is allowed to drop below the creep relaxation temperature, the heat deflection temperature, the Vicat softening temperature, or the melting temperature of the thermoplastic composition, as long as the thermoplastic composition only partially re-solidified, it can be used to attached the structure or the layers.

In general, the thermoplastic composition can have a creep relaxation temperature ($T_{cr}$) of about 80° C. to about 140° C., or from about 90° C. to about 130° C., or about 100° C. to about 120° C. In general, the thermoplastic composition can have a Vicat softening temperature ($T_{vs}$) of about 80° C. to about 140° C., or from about 90° C. to about 130° C., or about 100° C. to about 120° C. In general, the thermoplastic composition can have a heat deflection temperature ($T_{hd}$) of about 80° C. to about 140° C., or from about 90° C. to about 130° C., or about 100° C. to about 120° C. In general, the thermoplastic composition can have a melting temperature ($T_m$) of about 80° C. to about 140° C., or from about 90° C. to about 130° C., or about 100° C. to about 120° C.

As described above, the polymeric resin material and/or the filler is a thermoset composition. The thermoset composition can comprise a thermoset polyurethane polymer, thermoset polyurea polymer, thermoset polyamide polymer, thermoset polyolefin polymer, or thermoset silicone polymer, or a co-polymer or combination including any of the foregoing.

In addition to the elastomeric material, the polymeric resin material and/or the filler of the present disclosure can comprise a polymeric foam composition. For example, the polymeric foam composition can include a polyolefin foam, polyurethane foam, an ethylene-vinyl acetate (EVA) foam, a propylene foam, or a combination thereof. The polymeric foam composition can include a blend with one or more additional materials to impart additional characteristics or properties to the composition. The polymeric foam composition can include one or more other components. A foam composition can include a chemical blowing agent such as a carbonate, bicarbonate, carboxylic acid, azo compound, isocyanate, persulfate, peroxide, or a combination thereof. The foam composition can include about 1 parts per hundred resin to about 10 parts per hundred resin, or about 3 parts per hundred resin to about 7 parts per hundred resin of the chemical blowing agent. The chemical blowing agent has a decomposition temperature of about 130° C. to about 160° C., or about 135° C. to about 155° C. A foam composition can include a crosslinking agent such as an aliphatic unsaturated amide, such as methylenebisacryl- or -methacrylamide or ethylenebisacrylamide; aliphatic esters of polyols or alkoxylated polyols with ethylenically unsaturated acids, such as di(meth)acrylates or tri(meth)acrylates of butanediol or ethylene glycol, polyglycols or trimethylolpropane; di- and tri-acrylate esters of trimethylolpropane; acrylate and methacrylate esters of glycerol and pentaerythritol; allyl compounds, such as allyl (meth)acrylate, alkoxylated allyl (meth)acrylate, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, and tetraallylethylenediamine; or a mixture thereof. The foam composition can include about 0.1 parts per hundred resin to about 1.5 parts per hundred resin, or about 0.3 parts per hundred resin to about 0.8 parts per hundred resin of the crosslinking agent. A foam composition can include zinc oxide. The zinc oxide can be present from about 0.1 parts per hundred resin to about 5 parts per hundred resin, or about 0.7 parts per hundred resin to about 2 parts per hundred resin. The foam composition can include calcium carbonate. The calcium carbonate can be present from about 1 parts per hundred resin to about 10 parts per hundred resin, or from about 3 parts per hundred resin to about 7 parts per hundred resin. The foam composition can include a dye or pigment. The dye or pigment is present in the resin composition at a level of about 0 parts per hundred resin to about 10 parts per hundred resin, or about 0.5 parts per hundred resin to about 5 parts per hundred resin based upon the weight of the resin composition.

In addition, the polymeric resin material and/or the filler can include thermoplastic materials such as polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company of Midland, Mich., USA), "ELASTOLLAN" (BASF Corporation, Wyandotte, Mich., USA) and "ESTANE" (Lubrizol, Brecksville, Ohio, USA), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

The polymeric resin material can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLAST" ETPU available from Lubrizol (Brecksville, Ohio, USA); ethylene-vinyl alcohol copolymers marketed under the tradenames "EVAL" by Kuraray (Houston, Tex., USA), "SOARNOL" by Nippon Gohsei (Hull, England), and "SELAR OH" by DuPont (Wilmington, Del., USA); polyvinylidiene chloride available from S.C. Johnson (Racine, Wis., USA) under the tradename "SARAN", and from Solvay (Brussels, Belgium) under the tradename "IXAN"; liquid crystal polymers such as "VECTRA" from Celanese (Irving, Tex., USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly(vinyl alcohol)s; and polymethylpentene resins available from Mitsui Chemicals (Tokyo, Japan) under the tradename "TPX".

The following now describes aspects related to textiles such as footwear or textiles used in conjunction with footwear. The terms "filament," "fiber," or "fibers" as used herein refer to materials that are in the form of discrete elongated pieces that are significantly longer than they are wide. A "textile" may be defined as any material manufactured from fibers, filaments, or yarns characterized by flexibility, fineness, and a high ratio of length to thickness. Textiles generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like. A textile of the present disclosure can include at least one coated fiber.

The fiber can include natural, man-made or synthetic fibers. The fibers may be produced by conventional techniques, such as extrusion, electrospinning, interfacial polymerization, pulling, and the like. The fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed from synthetic polymers capable of forming fibers such as poly(ether ketone), polyimide, polybenzoxazole, poly(phenylene sulfide), polyesters, polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly(vinyl alcohol), polyamides, polyurethanes, and copolymers such as polyether-polyurea copolymers, polyester-polyurethanes, polyether block amide copolymers, or the like, as well as using polymers as described herein. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly(lactic acid).

The fibers can have an indefinite length. For example, man-made and synthetic fibers are generally extruded in substantially continuous strands. Alternatively, the fibers can be staple fibers, such as, for example, cotton fibers or extruded synthetic polymer fibers can be cut to form staple fibers of relatively uniform length. The staple fiber can have a have a length of about 1 millimeter to 100 centimeters or more as well as any increment therein (e.g., 1 millimeter increments).

The fiber can have any of a variety of cross-sectional shapes. Natural fibers can have a natural cross-section, or can have a modified cross-sectional shape (e.g., with processes such as mercerization). Man-made or synthetic fibers can be extruded to provide a strand having a predetermined cross-sectional shape. The cross-sectional shape of a fiber can affect its properties, such as its softness, luster, and wicking ability. The fibers can have round or essentially round cross sections. Alternatively, the fibers can have non-round cross sections, such as flat, oval, octagonal, rectangular, wedge-shaped, triangular, dog-bone, multi-lobal, multi-channel, hollow, core-shell, or other shapes.

The fiber can be processed. For example, the properties of fibers can be affected, at least in part, by processes such as drawing (stretching) the fibers, annealing (hardening) the fibers, and/or crimping or texturizing the fibers.

In some cases a fiber can be a multi-component fiber, such as one comprising two or more co-extruded polymeric materials. The two or more co-extruded polymeric materials can be extruded in a core-sheath, islands-in-the-sea, segmented-pie, striped, or side-by-side configuration. A multi-component fiber can be processed in order to form a plurality of smaller fibers (e.g., microfibers) from a single fiber, for example, by remove a sacrificial material.

The fiber can be a carbon fiber such as TARIFYL produced by Formosa Plastics Corp. of Kaohsiung City, Taiwan, (e.g., 12,000, 24,000, and 48,000 fiber tows, specifically fiber types TC-35 and TC-35R), carbon fiber produced by SGL Group of Wiesbaden, Germany (e.g., 50,000 fiber tow), carbon fiber produced by Hyosung of Seoul, South Korea, carbon fiber produced by Toho Tenax of Tokyo, Japan, fiberglass produced by Jushi Group Co., LTD of Zhejiang, China (e.g., E6, 318, silane-based sizing, filament diameters 14, 15, 17, 21, and 24 micrometers), and polyester fibers produced by Amann Group of Bonningheim, Germany (e.g., SERAFILE 200/2 non-lubricated polyester filament and SERAFILE COMPHIL 200/2 lubricated polyester filament).

A plurality of fibers includes 2 to hundreds or thousands or more fibers, where at least one of the fibers is coated while a majority or all of the fibers can be coated fibers. The plurality of fibers can be in the form of bundles of strands of fibers, referred to as tows, or in the form of relatively aligned staple fibers referred to as sliver and roving. A single type fiber can be used either alone or in combination with one or more different types of fibers by co-mingling two or more types of fibers. Examples of co-mingled fibers include polyester fibers with cotton fibers, glass fibers with carbon fibers, carbon fibers with aromatic polyimide (aramid) fibers, and aromatic polyimide fibers with glass fibers.

As used herein, the term "yarn" refers to an assembly formed of one or more fibers (e.g., where at least one is a coated fiber), wherein the strand has a substantial length and a relatively small cross-section, and is suitable for use in the production of textiles by hand or by machine, including textiles made using weaving, knitting, crocheting, braiding, sewing, embroidery, or ropemaking techniques. Thread is a type of yarn commonly used for sewing.

Yarns can be made using fibers formed of natural, man-made and synthetic materials. Synthetic fibers are most commonly used to make spun yarns from staple fibers, and filament yarns. Spun yarn is made by arranging and twisting staple fibers together to make a cohesive strand. The process of forming a yarn from staple fibers typically includes carding and drawing the fibers to form sliver, drawing out and twisting the sliver to form roving, and spinning the roving to form a strand. Multiple strands can be plied (twisted together) to make a thicker yarn. The twist direction of the staple fibers and of the plies can affect the final properties of the yarn. A filament yarn can be formed of a single long, substantially continuous filament, which is conventionally referred to as a "monofilament yarn," or a plurality of individual filaments grouped together. A filament yarn can also be formed of two or more long, substantially continuous filaments which are grouped together by grouping the filaments together by twisting them or entangling them or both. As with staple yarns, multiple strands can be plied together to form a thicker yarn.

Once formed, the yarn can undergo further treatment such as texturizing, thermal or mechanical treating, or coating with a material such as a synthetic polymer. The fibers, yarns, or textiles, or any combination thereof, used in the disclosed articles can be sized. Sized fibers, yarns, and/or textiles are coated on at least part of their surface with a sizing composition selected to change the absorption or wear characteristics, or for compatibility with other materials. The sizing composition facilitates wet-out and wet-through of the coating or resin upon the surface and assists in attaining desired physical properties in the final article. An exemplary sizing composition can comprise, for example, epoxy polymers, urethane-modified epoxy polymers, polyester polymers, phenol polymers, polyamide polymers, polyurethane polymers, polycarbonate polymers, polyetherimide polymers, polyamideimide polymers, polystylylpyridine polymers, polyimide polymers bismaleimide polymers, polysulfone polymers, polyethersulfone polymers, epoxy-modified urethane polymers, polyvinyl alcohol polymers, polyvinyl pyrrolidone polymers, and mixtures thereof.

Two or more yarns can be combined, for example, to form composite yarns such as single- or double-covered yarns, and corespun yarns. Accordingly, yarns may have a variety of configurations that generally conform to the descriptions provided herein.

The linear mass density or weight per unit length of a yarn can be expressed using various units, including denier (D) and tex. Denier is the mass in grams of 9000 meters of yarn. The linear mass density of a single filament of a fiber can also be expressed using denier per filament (DPF). Tex is the mass in grams of a 1000 meters of yarn. Decitex is another measure of linear mass, and is the mass in grams for a 10,000 meters of yarn.

As used herein, tenacity is understood to refer to the amount of force (expressed in units of weight, for example: pounds, grams, centinewtons or other units) needed to break a yarn (i.e., the breaking force or breaking point of the yarn), divided by the linear mass density of the yarn expressed, for example, in (unstrained) denier, decitex, or some other measure of weight per unit length. The breaking force of the yarn is determined by subjecting a sample of the yarn to a known amount of force, for example, using a strain gauge load cell such as an INSTRON brand testing system (Norwood, Mass., USA). Yarn tenacity and yarn breaking force are distinct from burst strength or bursting strength of a textile, which is a measure of how much pressure can be applied to the surface of a textile before the surface bursts.

Generally, in order for a yarn to withstand the forces applied in an industrial knitting machine, the minimum tenacity required is approximately 1.5 grams per Denier. Most yarns formed from commodity polymeric materials generally have tenacities in the range of about 1.5 grams per Denier to about 4 grams per Denier. For example, polyester yarns commonly used in the manufacture of knit uppers for footwear have tenacities in the range of about 2.5 to about 4 grams per Denier.

Yarns formed from commodity polymeric materials which are considered to have high tenacities generally have tenacities in the range of about 5 grams per Denier to about 10 grams per Denier. For example, commercially available package dyed polyethylene terephthalate yarn from National Spinning (Washington, N.C., USA) has a tenacity of about 6 grams per Denier, and commercially available solution dyed polyethylene terephthalate yarn from Far Eastern New Century (Taipei, Taiwan) has a tenacity of about 7 grams per Denier. Yarns formed from high performance polymeric materials generally have tenacities of about 11 grams per Denier or greater. For example, yarns formed of aramid fiber typically have tenacities of about 20 grams per Denier, and yarns formed of ultra-high molecular weight polyethylene (UHMWPE) having tenacities greater than 30 grams per Denier are available from Dyneema (Stanley, N.C., USA) and Spectra (Honeywell-Spectra, Colonial Heights, Va., USA).

Various techniques exist for mechanically manipulating yarns to form a textile. Such techniques include, for example, interweaving, intertwining and twisting, and interlooping. Interweaving is the intersection of two yarns that cross and interweave at right angles to each other. The yarns utilized in interweaving are conventionally referred to as "warp" and "weft." A woven textile includes include a warp yarn and a weft yarn. The warp yarn extends in a first direction, and the weft strand extends in a second direction that is substantially perpendicular to the first direction. Intertwining and twisting encompasses various procedures, such as braiding and knotting, where yarns intertwine with each other to form a textile. Interlooping involves the formation of a plurality of columns of intermeshed loops, with knitting being the most common method of interlooping. The textile may be primarily formed from one or more yarns that are mechanically-manipulated, for example, through interweaving, intertwining and twisting, and/or interlooping processes, as mentioned above.

The textile can be a nonwoven textile. Generally, a nonwoven textile or fabric is a sheet or web structure made from fibers and/or yarns that are bonded together. The bond can be a chemical and/or mechanical bond, and can be formed using heat, solvent, adhesive or a combination thereof. Exemplary nonwoven fabrics are flat or tufted porous sheets that are made directly from separate fibers, molten plastic and/or plastic film. They are not made by weaving or knitting and do not necessarily require converting the fibers to yarn, although yarns can be used as a source of the fibers. Nonwoven textiles are typically manufactured by putting small fibers together in the form of a sheet or web (similar to paper on a paper machine), and then binding them either mechanically (as in the case of felt, by interlocking them with serrated or barbed needles, or hydro-entanglement such that the inter-fiber friction results in a stronger fabric), with an adhesive, or thermally (by applying binder (in the form of powder, paste, or polymer melt) and melting the binder onto the web by increasing temperature). A nonwoven textile can be made from staple fibers (e.g., from wetlaid, airlaid, carding/crosslapping processes), or extruded fibers (e.g., from meltblown or spunbond processes, or a combination thereof), or a combination thereof. Bonding of the fibers in the nonwoven textile can be achieved with thermal bonding (with or without calendering), hydro-entanglement, ultrasonic bonding, needlepunching (needlefelting), chemical bonding (e.g., using binders such as latex emulsions or solution polymers or binder fibers or powders), meltblown bonding (e.g., fiber is bonded as air attenuated fibers intertangle during simultaneous fiber and web formation).

EXAMPLES

The present disclosure is more particularly described in the following examples that are intended as illustrations only, since numerous modifications and variations within the scope of the present disclosure will be apparent to those skilled in the art.

Example 1: Noise Reducing Article

Cured outsole rubber factory waste from an athletic footwear factory is ground (milled) to produce the filler. The outsole rubber factory waste is fully cured rubber in the shape of defective outsole components, flash from molding processes, and defective components, or excess inventory components cut from sheet. The formulation cured to produce the rubber waste includes butyl rubber and a zinc oxide-based activator. The waste cured rubber is ground and screened using conventional chopping and screening equipment to a maximum dimension of about 1 mm to about 3 mm, and passes through a size 40 mesh.

The filler is then incorporated into a TPU resin material using an extrusion process. Articles are formed having different levels of filler suspended and encapsulated in the TPU resin, ranging from about 5 weight percent filler to about 20 weight percent filler. Specifically, articles are formed having about 5 weight percent, about 10 weight percent, about 15 weight percent, and about 20 weight percent of the cured rubber granules. The addition of the cured rubber granules from outsole rubber to the TPU resin increased the density of the resulting material as compared to the density of the unfilled TPU resin. The addition of the cured rubber granules from outsole rubber to the TPU resin also increases the Noise Reduction Coefficient (NRC) of the article as compared an article formed of the TPU resin without filler or formed from TPU resin with the same weight percent of ground tire rubber as the filler.

Example 2: Noise Reducing and Insulating Article

Cured rubber outsoles and foam cushioning elements from post-consumer waste athletic footwear (i.e., recycled worn footwear) are ground to produce the filler. The formulation cured to produce the fully cured rubber outsoles includes butyl rubber and a zinc oxide-based activator. The foam is a crosslinked EVA foam formed using a chemical foaming agent. The outsoles and cushioning elements are ground using conventional chopping equipment to a maximum dimension of about 1 mm to about 3 mm. The filler includes about 80 weight percent of the EVA foam and about 20 weight percent of the cured rubber.

The filler is then incorporated into a TPU resin material using an extrusion process. Articles are formed having different levels of filler suspended and encapsulated in the TPU resin, ranging from about 5 weight percent filler to about 20 weight percent filler. Specifically, articles are formed having about 5 weight percent, about 10 weight percent, about 15 weight percent, and about 20 weight percent of the mixture of cured rubber granules and foam granules. The addition of the cured rubber granules and foam granules from ground post-consumer waste footwear to the TPU resin increased the density of the resulting article as compared to the density of the unfilled TPU resin. The addition of the cured rubber granules and the foam granules from ground post-consumer waste footwear to the TPU resin increases the Noise Reduction Coefficient (NRC) of the article as compared to an article formed without filler and formed using the same weight percent of ground tire rubber as the filler. The addition of the cured rubber granules and the foam granules from ground post-consumer waste footwear to the TPU resin also increased the thermal resistance (K/w) of the article as compared to an article without filler, or an article wing the same weight percent of ground tire rubber as the filler.

Example 3: Noise Reducing and Insulation Article with Improved Abrasion Resistance Whole athletic footwear including textile uppers, foam cushioning elements, and cured outsole rubber are ground using a granulator to produce the filler. The source of the whole footwear can be post-consumer waste athletic footwear (i.e., recycled worn footwear). Alternatively or additionally, the source of the whole footwear can be rejected factory products or excess inventory.

Depending on the portion of textile fibers desired in the filler, the upper of the article of footwear may be roughly separated from the midsole and outsole prior to grinding. Additionally or alternatively, to reduce the proportion of textile fibers in the filler, after grinding a portion of the textile fibers (e.g., from the upper portion of the footwear, such as natural leather, synthetic leather, yarns, threads, etc.) may be roughly separated from the cured rubber granules and the foam granules.

The filler produced includes about 50 weight percent textile fibers, and about 50 weight percent of a mixture of cured rubber granules and foam granules having a maximum dimension of about 1 mm to about 3 mm. The filler is combined with a polyurethane using extrusion or a Banbury mixer. to produce the filled polymeric resin. Articles are formed from the filled polymeric resin using different levels of filler suspended and encapsulated in the polyurethane, ranging from about 5 weight percent filler to about 20 weight percent filler. Specifically, articles are formed having about 5 weight percent, about 10 weight percent, about 15 weight percent, and about 20 weight percent of the mixture of cured rubber granules and foam granules. The addition of the filler including a mixture of cured rubber granules, foam granules and textile fibers from ground footwear to the PU resin decreased the density of the resulting articles, increases the tensile strength of the articles, and increased the abrasion resistance of the articles, as compared to the density of the unfilled PU resin. The addition of the cured rubber granules, the foam granules, and the textile fibers from ground footwear to the PU resin increases the Noise Reduction Coefficient (NRC) of the article as compared to an article formed without filler and formed using the same weight percent of ground tire rubber as the filler. The addition of the cured rubber granules, the foam granules, and the textile fibers from ground footwear to the PU resin also increased the thermal resistance (K/w) of the article as compared to an article without filler, or an article wing the same weight percent of ground tire rubber as the filler.

CLAUSES

Clause 1. An article comprising:
a polymeric resin material comprising a filler, wherein the filler includes a plurality of cured rubber granules, foam granules, textile fibers, or a combination thereof, wherein the filler is suspended in and encapsulated by the polymeric resin material.

Clause 2. The article of clause 1, wherein the polymeric resin material, the filler, or both include waste or scrap material from footwear manufacturing, or from ground post-consumer waste footwear.

Clause 3. The article of any preceding clause, wherein the polymeric resin material comprises one or more thermoplastic polymers.

Clause 4. The article of any preceding clause, wherein the one or more thermoplastic polymers includes a thermoplastic polyurethane (TPU).

Clause 5. The article of any preceding clause, wherein the TPU includes waste or scrap TPU from footwear manufacturing.

Clause 6. The article of any preceding clause, wherein the at least one TPU includes a TPU derived from an aromatic isocyanate or an alkyl isocyanate.

Clause 7. The article of any preceding clause, wherein the TPU derived from an aromatic isocyanate is a TPU derived from methylene diphenyl diisocyanate (MDI).

Clause 8. The article of any preceding clause, wherein the polymeric resin material comprises one or more thermoset polymers.

Clause 9. The article of any preceding clause, wherein the one or more thermoset polymers include a natural or synthetic cured rubber composition.

Clause 10. The article of any preceding clause, wherein the article is a sheet of the polymeric resin material.

Clause 11. The article of any preceding clause, wherein the sheet has a thickness of at least 2 mm.

Clause 12. The article of any preceding clause, wherein the article includes at least 50 percent by weight of the filler based on a total weight of the article.

Clause 13. The article of any preceding clause, wherein the filler includes ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof.

Clause 14. The article of any preceding clause, wherein the filler includes at least 50 percent by weight of a mixture of the post-consumer waste cured rubber granules and the post-consumer waste foam granules.

Clause 15. The article any preceding clause, wherein the filler includes a plurality of granules each of which includes a portion of cured rubber affixed to a portion of foam, the filler includes the foam granules, and the foam granules include granules of a foam including an ethylene-vinyl acetate (EVA) copolymer, the filler includes the foam granules, and the foam granules include granules of a foam including a styrene-ethylene-butadiene-styrene (SEBS) copolymer, or a combination.

Clause 16. The article of any preceding clause, wherein the filler includes the foam granules, and the foam granules have a specific gravity of from about 0.1 to about 0.5.

Clause 17. The article of any preceding clause, wherein the filler includes the cured rubber granules, the foam granules or both, and a maximum dimension of the cured rubber granules, the foam granules or both is 5 mm or less.

Clause 18. The article of any preceding clause, wherein the article has an elongation of at least 50 percent.

Clause 19. The article of any preceding clause, wherein the article has a Shore A hardness of less than 40.

Clause 20. The article of any preceding clause, wherein the article is a construction material.

Clause 21. The article of any preceding clause, wherein the article is an acoustical panel or underlayment.

Clause 22. The article of any preceding clause, wherein the acoustical panel or underlayment has a Delta IIC rating of at least 20.

Clause 23. The article of any preceding clause, wherein the article has a sound transmission loss which is at least 10 percent greater than a sound transmission loss of a second article, wherein the second article comprises a second polymeric resin material comprising a second filler, wherein the second polymeric resin material is the same as the polymeric resin material of the article, but the second filler consists essentially of tire rubber granules, wherein a concentration of the tire rubber granules in the second polymeric resin material is within 2 weight percent of a concentration of the filler in the polymeric resin material of the article.

Clause 24. The article of any preceding clause, wherein the article is an insulating panel or underlayment.

Clause 25. The article of any preceding clause, wherein the insulating panel or underlayment has an R rating of at least 5.

Clause 26. The article of any preceding clause, wherein the article has a thermal resistance at least 10 percent greater than a thermal resistance of a second article, wherein the second article comprises a second polymeric resin material comprising a second filler, wherein the second polymeric resin material is the same as the polymeric resin material of the article, but the second filler consists essentially of tire rubber granules, wherein a concentration of the tire rubber granules in the second polymeric resin material is within 2 weight percent of a concentration of the filler in the polymeric resin material of the article.

Clause 27. A method of manufacturing an article, the method comprising:
suspending a filler in a polymeric resin material, wherein the filler comprises a plurality of cured rubber granules, foam granules, textiles fibers, or a combination thereof, and
solidifying the polymeric resin material, thereby encapsulating the suspended filler in solidified polymeric resin material.

Clause 28. The method of clause 27, wherein the method further comprises milling cured rubber to form the cured rubber granules, or milling foam to form the foam granules, or milling or shredding textiles to form the textile fibers, or a combination thereof.

Clause 29. The method of any preceding clause, wherein the milling comprises mechanically milling, cryogenically milling, or both.

Clause 30. The method of any preceding clause, wherein the milling comprises milling post-consumer waste footwear to form the filler.

Clause 31. The method of any preceding clause, wherein the milling comprises milling manufacturing waste and scrap materials to form the filler.

Clause 32. The method of any preceding clause, wherein the polymeric resin material comprises one or more thermoplastic polymers, and solidifying the polymeric resin material comprises reducing a temperature of the polymeric resin material to a temperature at least 20 degrees C. below a melting point of the one or more thermoplastic polymers.

Clause 33. The method of any preceding clause, wherein the polymeric resin material comprises one or more thermoset polymers, and solidifying the polymeric resin material comprises curing the polymeric resin material.

Clause 34. The method of any preceding clause, wherein curing the polymeric resin material comprises forming physical or chemical crosslinks between a plurality of polymers of the polymeric resin material.

Clause 35. The method of any preceding clause, wherein the article is an article according to any one of clauses 1 to 26.

Clause 36. An article manufactured according to the method of any preceding clause.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 wt percent to about 5 wt percent, but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term "about" can include traditional rounding according to significant figures of the numerical value. In addition, the phrase "about 'x' to 'y'" includes "about 'x' to about 'y'".

Many variations and modifications may be made to the above-described aspects, embodiments and examples. All such modifications and variations are intended to be included herein within the scope of this disclosure and protected by the following claims.

The invention claimed is:

1. An article comprising:
a polymeric resin material comprising a filler, wherein the filler includes a mixture of cured rubber granules, foam granules, and textile fibers, wherein the filler is suspended in and encapsulated by the polymeric resin material, wherein the polymeric resin is thermoplastic polyurethane (TPU).

2. The article of claim 1, wherein the polymeric resin material, the filler, or both include waste or scrap material from footwear manufacturing, or from ground post-consumer waste footwear.

3. The article of claim 1, wherein the TPU includes waste or scrap TPU from footwear manufacturing.

4. The article of claim 1, wherein the article includes at least 50 percent by weight of the filler based on a total weight of the article.

5. The article of claim 4, wherein the filler includes ground waste or scrap cured rubber from footwear manufacturing, ground waste, scrap foam from footwear manufacturing, ground or shredded waste or scrap textile fibers from footwear manufacturing, post-consumer waste ground cured rubber from footwear, post-consumer waste ground foam from footwear, post-consumer waste ground or shredded textile fibers from footwear, or a combination thereof.

6. The article of claim 1, wherein the filler includes at least 50 percent by weight of a mixture of the post-consumer waste cured rubber granules and the post-consumer waste foam granules.

7. The article of claim 6, wherein the foam granules include granules of a foam including an ethylene-vinyl acetate (EVA) copolymer, granules of a foam including a styrene-ethylene-butadiene-styrene (SEBS) copolymer, or a combination.

8. The article of claim 7, wherein the filler includes the cured rubber granules, the foam granules or both, and a maximum dimension of the cured rubber granules, the foam granules or both is 5 mm or less.

9. The article of claim 1, wherein the article has an elongation of at least 50 percent, the article has a Shore A hardness of less than 40, or both.

10. The article of claim 1, wherein the article is an acoustical panel or underlayment, wherein the acoustical panel or underlayment has a Delta IIC rating of at least 20.

11. The article of claim 10, wherein the article has a sound transmission loss which is at least 10 percent greater than a sound transmission loss of a second article, wherein the second article comprises a second polymeric resin material comprising a second filler, wherein the second polymeric resin material is the same as the polymeric resin material of the article, but the second filler consists essentially of tire rubber granules, wherein a concentration of the tire rubber granules in the second polymeric resin material is within 2 weight percent of a concentration of the filler in the polymeric resin material of the article.

12. The article of claim 1, wherein the article is an insulating panel or underlayment, wherein the insulating panel or underlayment has an R rating of at least 5.

13. The article of claim 12, wherein the article has a thermal resistance at least 10 percent greater than a thermal resistance of a second article, wherein the second article comprises a second polymeric resin material comprising a second filler, wherein the second polymeric resin material is the same as the polymeric resin material of the article, but the second filler consists essentially of tire rubber granules, wherein a concentration of the tire rubber granules in the second polymeric resin material is within 2 weight percent of a concentration of the filler in the polymeric resin material of the article.

14. The article of claim 1, wherein the foam granules are from post-consumer waste ground foam from footwear.

15. The article of claim 14, wherein the filler includes at least 50 percent by weight of the post-consumer waste foam granules.

16. The article of claim 1, wherein the textile fibers are from post-consumer waste ground or shredded textile fibers from footwear.

17. The article of claim 1, wherein the foam granules include granules: of a foam including an ethylene-vinyl acetate (EVA) copolymer, of a foam including a styrene-ethylene-butadiene-styrene (SEBS) copolymer, or a combination.

* * * * *